Figure 1:
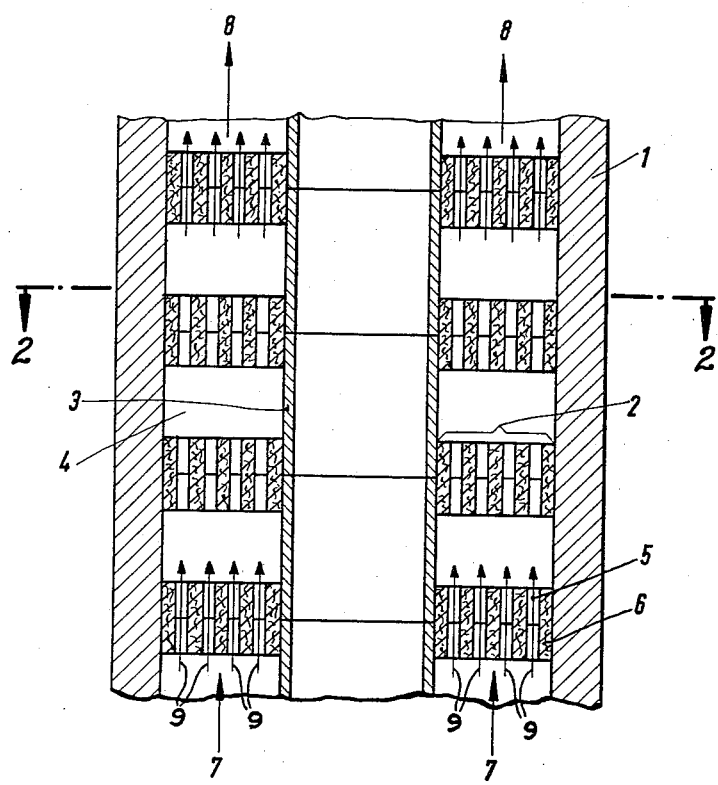

United States Patent Office 3,122,430
Patented Feb. 25, 1964

3,122,430
OIL SEPARATOR FOR GASES
Max Seidel, Munich-Solln, and Andreas Mayer, Pullach, Germany, assignors to Gesellschaft für Linde's Eismaschinen Aktiengesellschaft, Munich, Germany, a company of Germany
Filed June 27, 1960, Ser. No. 38,859
Claims priority, application Germany Aug. 14, 1959
1 Claim. (Cl. 55—278)

This invention relates to an apparatus for the separation of oil and/or other liquid particles from gases or vapors, especially compressed gases containing the same.

In particular, after compression in oil-lubricated compressors, the concentrated gases even after passing through the usual separators still contain so much oil—finely divided as a mist—that this condition has a disturbing effect in the deep cooling and liquefaction of the gas. Various processes have therefore been developed to remove finely divided oil from gases, which is especially hard to achieve in dry circulation gases.

One known process is the separation of oil from high-pressure air by the aid of cyclone separators. However, there always remains a residual content of oil in the gas which is too high, especially for low-temperature apparatus, and which must be removed by other means.

Separation of oil by means of gels or of activated carbon, also known, is unprofitable because of the high cost of the cleansing agents, and the remaining expedient, an oil filter, in which the gas must flow through a mass of filtering material, is characterized by a very high flow resistance, and therefore causes great loss of pressure.

The apparatus according to the present invention avoids these disadvantages. It proceeds from the concept that very finely divided oil is separated from gases carrying the same if these gases are conducted in thin layers over the surface of an absorbent porous material, especially felt. In this way, flow losses are a great deal less than when the flow is through such material. Nevertheless, a better separation of the oil is attained.

Accordingly, the apparatus according to this invention for the separation of oil from gases and vapors carrying the same by means of a porous material is distinguished by the fact that the gaseous medium, in a thin flow layer, flows along the surface of the absorbent porous material. Provision must therefore be made that the stream of gas to be purified is divided into a very great number of thin layers which flow over the surfaces of the absorbent material. This may be effected in manifold ways.

One possibility is to cause the gas to flow between layers of absorbent material, for example, felt, which are held at a slight distance from each other by suitable spacers, fastened to the wall or loose, such as granular or thread-like objects. The absorbent material itself may occur in the form of plates or strips or in ring, spiral or other appropriate form.

The absorbent material itself may also be made into a form through which small channels result between this material and a wall of another layer of this material. This can be effected by having grooves or corrugations on its surface, for example, which may be of any desired shape. In some cases for the fixing of this form the absorbent material will need to be stiffened with inlays of metal or plastic by enclosing in screen or wire, or by other means.

Another especially advantageous arrangement comprises the absorbent material, which may preferably consist of strips of felt into the form of rings or spirals, the single layers of this absorbent material being spaced apart by means of form-stable and oil-proof bands, for example, metal bands, which are so designed that between them and the absorbent material only small cross-sections remain free through which the gas can flow. A number of such arrangements can be placed together in a pressure tank, so that a repeated re-division of the streams of gas improves the separation.

The spacing strips can be shaped in various ways, or stamped; corrugated strips are especially simple and effective. In these, the corrugations may run parallel or diagonally to the direction of gas flow. In the latter case, the absorbent material may suitably lie between opposed corrugated strips. Moreover, the direction of the diagonal corrugations may change several times on one or both sides.

Instead of flat absorbent material it is also possible to use—at least in part—filling bodies, especially in the form of Raschig rings, of absorbent material. If desired, these filling bodies may be stiffened by inlays or jackets of plastic, metal or the like, especially in the form of wires or screens. This invention also comprises the combining of several of the possibilities mentioned.

As absorbent material there may be used felt, preferably, and also other substances, such as cotton wadding, cellulose, filter paper and the like. It is also possible, however, to use other substances, such as sinter metal and ceramic sinter materials for this purpose. It may be advantageous to roughen the surface of the absorbent material by a suitable preliminary treatment.

One design for an oil separator according to this invention is shown schematically, and by way of example, in the accompanying drawing. The separator is shown in cylindrical form but other shapes are possible.

Figure 2:
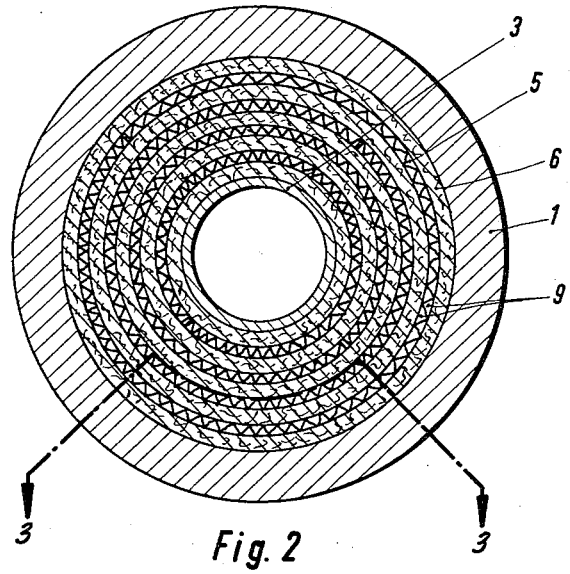
Figure 3:
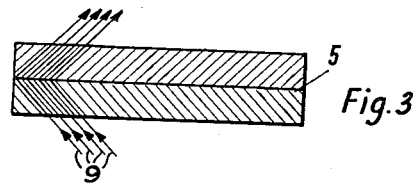
Figure 4:
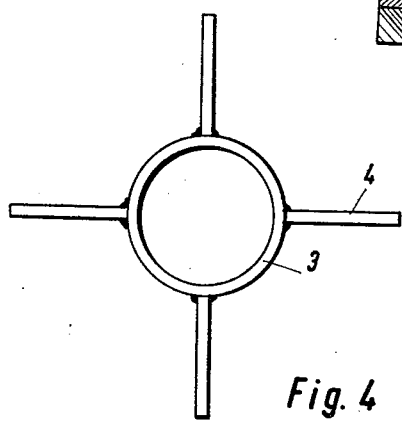

FIG. 1 shows a longitudinal section through the oil separator, in which only its central part is shown, FIG. 2 is a cross section on line 2—2 of FIG. 1, FIG. 3 is the section marked 3—3 on FIG. 2, and FIG. 4 shows in cross section an operable form of spacing member.

In a tank 1, which in the drawing has a cylindrical form, there are arranged a number of oil separator elements 2. They are held in position by spacing members like that shown in section in FIG. 4. These spacing members consist of a cylindrical seamless pipe 3 to which are welded or soldered a plurality of e.g. four spaced metal wings 4, the width of which corresponds to the distance between two oil separators elements. The cylindrical parts 3 are long enough so that they lie together when assembled and give a closed pipe which can be sealed by closing plates (not shown) above and below, so that the whole arrangement can be held together by a bolt (not shown) going all the way through at the middle.

The closing of the tank 1 at both ends is so designed that it is gas-tight, particularly by means of threading or by means of flanges, to which the feed and outlet lines can be connected. The cylindrical outer jacket is suitably tapered to the diameter of the connection pipe.

The oil separator element itself is assembled from circular or spiral strips of absorbent material 6, especially felt, and corrugated strips 5, which may consist of thin sheet metal, for example. Such a strip, in which the corrugations lie diagonally to the flow direction of the gas and also change their direction once at the level of the absorbent material, is shown in FIG. 3.

The gas flows through a connection device (not shown) enters the oil separator at point 7, flows through oil separator elements 2 by means of the channels that remain between the corrugated metal strips 5 and the circular strips of absorbent material 6 in the direction indicated by arrows 9, and leaves the cylindrical part at point 8 after flowing through several such oil separator elements.

We claim:

A device for the separation of oil particles from a current of gas or vapor in which such oil particles may be entrained, which comprises a vessel having a cylindrical wall;
- a plurality of spacing arrangements within said vessel each arrangement consisting of a pipe section and a group of plate-like spacing members secured to said pipe section in radical relation to the latter,
- said spacing members having a height substantially less than the length of the pipe section,
- said spacing arrangements being adapted to fit into said vessel in such manner that the pipe sections lie axially together to form in effect a closed pipe as long as said vessel and each two groups of plate-like spacing members define between them a separation space;
- a plurality of annular oil separator elements each of said separator elements filling one of said separator spaces,
- each such annular oil separator element consisting of a first group of annular strips of absorbent porous material selected from the group consisting of felt, cotton wadding, cellulose, filter paper, sinter metal and ceramic filter material, and a second group of generally annular strips of sheet metal sandwiched between said strips of porous material;
- the annular strips constituting said second group being so corrugated as to provide a plurality of small channels between surfaces of the strips of porous material and surfaces of the annular sheet metal strips said channels extending diagonally to the direction of flow of a gas to be purified and from one end of the vessel to the other,
- said oil separator elements being so positioned, one after the other, in the direction of the axis of the vessel that the channels form zigzag lines, a gas to be purified flowing, from one end to the other of the vessel, by way of said channels, in repeated contact with surfaces of porous material.

References Cited in the file of this patent

UNITED STATES PATENTS

| | | |
|---|---|---|
| 1,729,135 | Slauson | Sept. 24, 1929 |
| 2,669,995 | Troy | Feb. 23, 1954 |

FOREIGN PATENTS

| | | |
|---|---|---|
| 191,348 | Switzerland | Dec. 16, 1937 |
| 528,945 | Great Britain | Nov. 11, 1940 |